(12) United States Patent
VanBlon et al.

(10) Patent No.: US 11,048,782 B2
(45) Date of Patent: Jun. 29, 2021

(54) USER IDENTIFICATION NOTIFICATION FOR NON-PERSONAL DEVICE

(71) Applicant: Lenovo (Singapore) Pte. Ltd., Singapore (SG)

(72) Inventors: Russell Speight VanBlon, Raleigh, NC (US); Kevin Wayne Beck, Raleigh, NC (US); Thorsten Peter Stremlau, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 288 days.

(21) Appl. No.: 16/018,884

(22) Filed: Jun. 26, 2018

(65) Prior Publication Data

US 2019/0392121 A1 Dec. 26, 2019

(51) Int. Cl.
*G06F 21/00* (2013.01)
*G06F 21/31* (2013.01)
*G06F 3/01* (2006.01)
*G06F 21/32* (2013.01)

(52) U.S. Cl.
CPC ............. *G06F 21/31* (2013.01); *G06F 3/01* (2013.01); *G06F 21/32* (2013.01)

(58) Field of Classification Search
CPC . G06F 21/31; G06F 3/01; G06F 21/32; G06F 21/316
See application file for complete search history.

(56) References Cited

U.S. PATENT DOCUMENTS

| | | | |
|---|---|---|---|
| 10,096,319 B1* | 10/2018 | Jin | G10L 25/63 |
| 10,425,780 B1* | 9/2019 | Devaraj | H04W 8/186 |
| 10,460,215 B2* | 10/2019 | Herold | G10L 15/1822 |
| 2017/0357478 A1* | 12/2017 | Piersol | G10L 15/30 |
| 2018/0206083 A1* | 7/2018 | Kumar | H04L 67/22 |
| 2018/0287809 A1* | 10/2018 | DeLapa | H04L 12/1822 |
| 2019/0130707 A1* | 5/2019 | Gruber | G08B 3/1016 |
| 2019/0305979 A1* | 10/2019 | Ramirez | H04N 21/43615 |
| 2019/0305982 A1* | 10/2019 | Ramirez | H04L 12/2827 |
| 2019/0348040 A1* | 11/2019 | Mann | H04L 67/18 |

OTHER PUBLICATIONS

Vogel et al., "Interactive public ambient displays: transitioning from implicit to explicit, public to personal, interaction with multiple users", UIST '04: Proceedings of the 17th annual ACM symposium on User interface software and technology, pp. 137-146, Oct. 2004.*

* cited by examiner

*Primary Examiner* — Morshed Mehedi
(74) *Attorney, Agent, or Firm* — Ference & Associates LLC

(57) ABSTRACT

One embodiment provides a method, including: receiving, at a non-personal information handling device, user characteristic data associated with a user; determining, using a processor and based on the user characteristic data, an identity of the user; and providing, based on the determining, a user identification notification. Other aspects are described and claimed.

16 Claims, 3 Drawing Sheets

USER IDENTIFICATION NOTIFICATION FOR NON-PERSONAL DEVICE

BACKGROUND

Information handling devices ("devices"), for example smart phones, tablet devices, smart speakers, laptop and personal computers, and the like, may be capable of receiving user command inputs and providing outputs responsive to the inputs. For example, a user may interact with a digital assistant resident on a device owned or frequently operated by a user (e.g., a user's smart phone, a household smart speaker, etc.). Generally, prior to providing command inputs, conventional digital assistants need to be awakened, e.g., by the use of one or more predetermined wakeup words, etc. Responsive to receiving a wake word, a digital assistant may provide some type of acknowledgement output to the user (e.g., an audible greeting, a visual indication, etc.) to indicate that it is active and ready to receive command inputs.

BRIEF SUMMARY

In summary, one aspect provides a method, comprising: receiving, at a non-personal information handling device, user characteristic data associated with a user; determining, using a processor and based on the user characteristic data, an identity of the user; and providing, based on the determining, a user identification notification.

Another aspect provides an information handling device, comprising: a processor; a memory device that stores instructions executable by the processor to: receive user characteristic data associated with a user; determine, based on the user characteristic data, an identity of the user; and provide, based on the determining, a user identification notification; wherein the information handling device is a non-personal information handling device.

A further aspect provides a product, comprising: a storage device that stores code, the code being executable by a processor and comprising: code that receives, at a non-personal device, user characteristic data associated with a user; code that determines, based on the user characteristic data, an identity of the user; and code that provides, based on the code that determines, a user identification notification.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
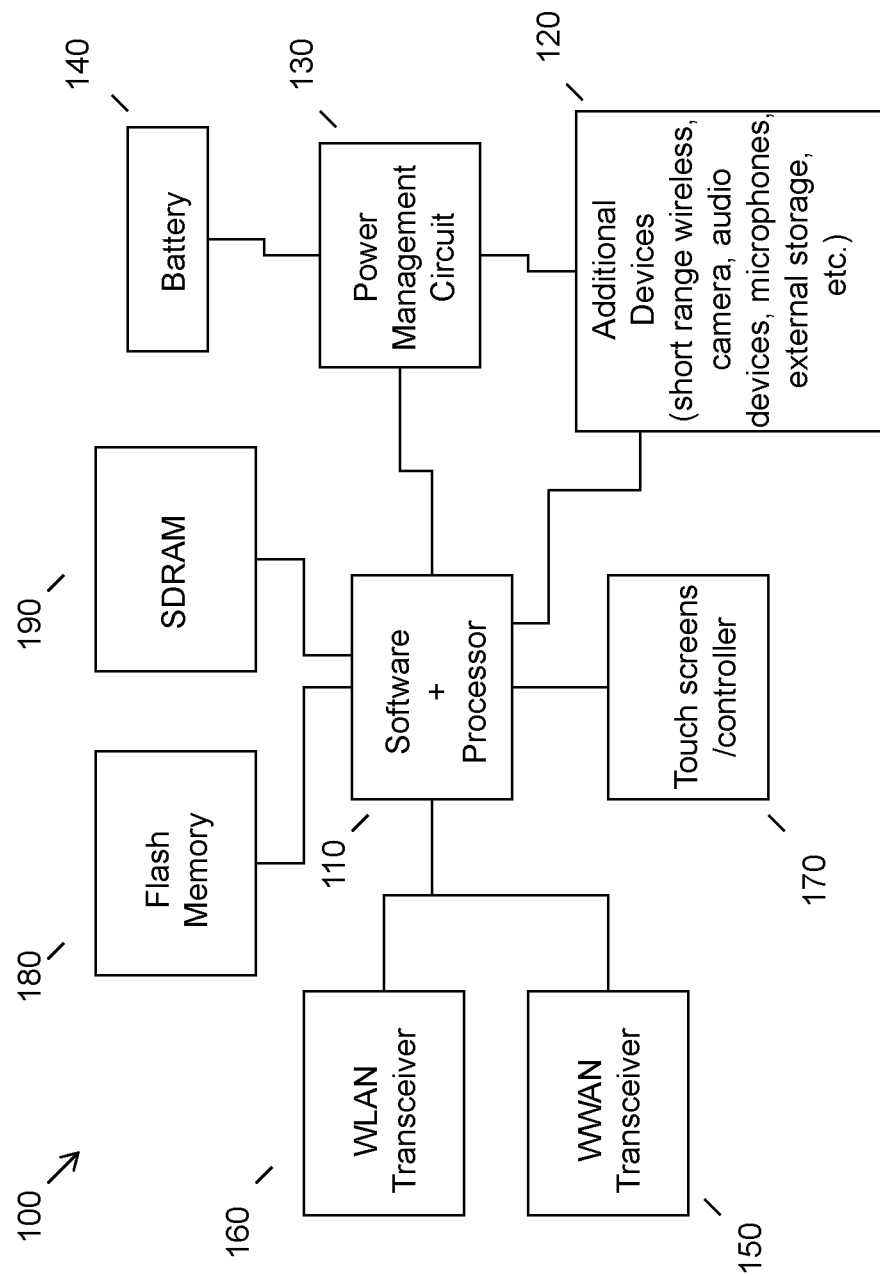
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Digital assistants have recently begun to work for a wider audience than just for the purchaser of a device the digital assistant is resident on. For example, digital assistants may be disposed in public places (e.g., airports, restaurants, amusement parks, hotels, etc.) where a variety of different users may interact with them. A group of these public, or non-personal digital assistants, may activate responsive to receiving the same wakeup word. For example, all publicly located AMAZON ECHO devices may activate and respond to the wakeup word, "Alexa". AMAZON ECHO is a registered trademark of Amazon Technologies, Inc.

Conventional digital assistants provide acknowledgement output after a user speaks a known wakeup word. For example, responsive to identifying a known wakeup word, a digital assistant may provide some type of acknowledgement output (e.g., an audible greeting, a visual acknowledgement, etc.) that the digital assistant is primed to receive further user inputs. However, although a non-personal digital assistant may be activated by many different users, it may not be able to perform a user-specific action. More particularly, if a digital assistant cannot determine the identity of a user and the user provides a command that requires some knowledge of the user's identity, then the digital assistant may not be able to provide the proper output or perform the requested task. For example, if a user visits a friend's house and provides the command "play my party playlist" to the friend's digital assistant, the friend's digital assistant may not know how to process the pronoun "my". For instance, the digital assistant may play a party playlist associated with the owner of the device instead of the requesting user. Alternatively, the digital assistant may simply provide output indicating that they are unable to process the command. Furthermore, without knowing whether a digital assistant has properly identified a user, the user may look foolish providing user-specific commands that are not properly processed.

Accordingly, an embodiment provides a method for providing the user with an indication that a non-personal digital assistant has identified a particular user and is capable of receiving and processing user-specific wake words or commands. In an embodiment, user characteristic data associated with a user may be received at a non-personal device (e.g., a digital assistant device disposed in a public location, a shared space, a multi-user home, etc.). An embodiment may then determine an identity of the user based on the user characteristic data and thereafter provide a user identification notification to the user. In an embodiment, the user identification notification may be a specific notification that is associated with and/or familiar to the user (e.g., a unique audio, visual, or haptic notification, etc.). Such a method may therefore inform a user that a non-personal device has recognized a user's identity and is capable of performing user-specific functions and/or loading user-specific settings.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes one or more touch screens 170 for data input and display/rendering. System 100 also typically includes various memory devices, for example flash memory 180 and SDRAM 190.

Figure 2:
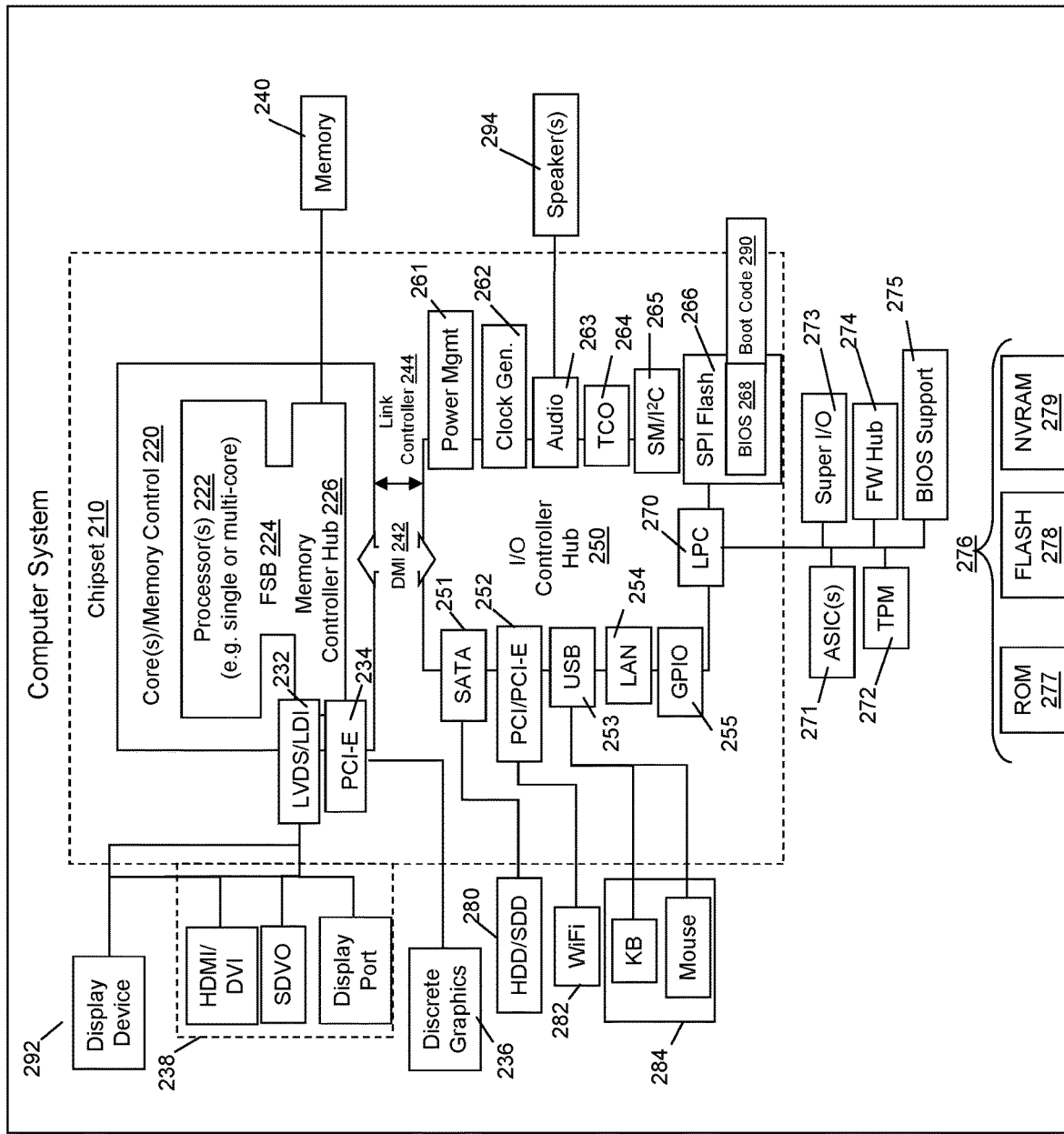
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart speakers, smart appliances, personal computer devices generally, and/or electronic devices that are capable of supporting a digital assistant that may receive and process user inputs. For example, the circuitry outlined in FIG. 1 may be implemented in a tablet or smart phone embodiment, whereas the circuitry outlined in FIG. 2 may be implemented in a laptop embodiment.

Figure 3:
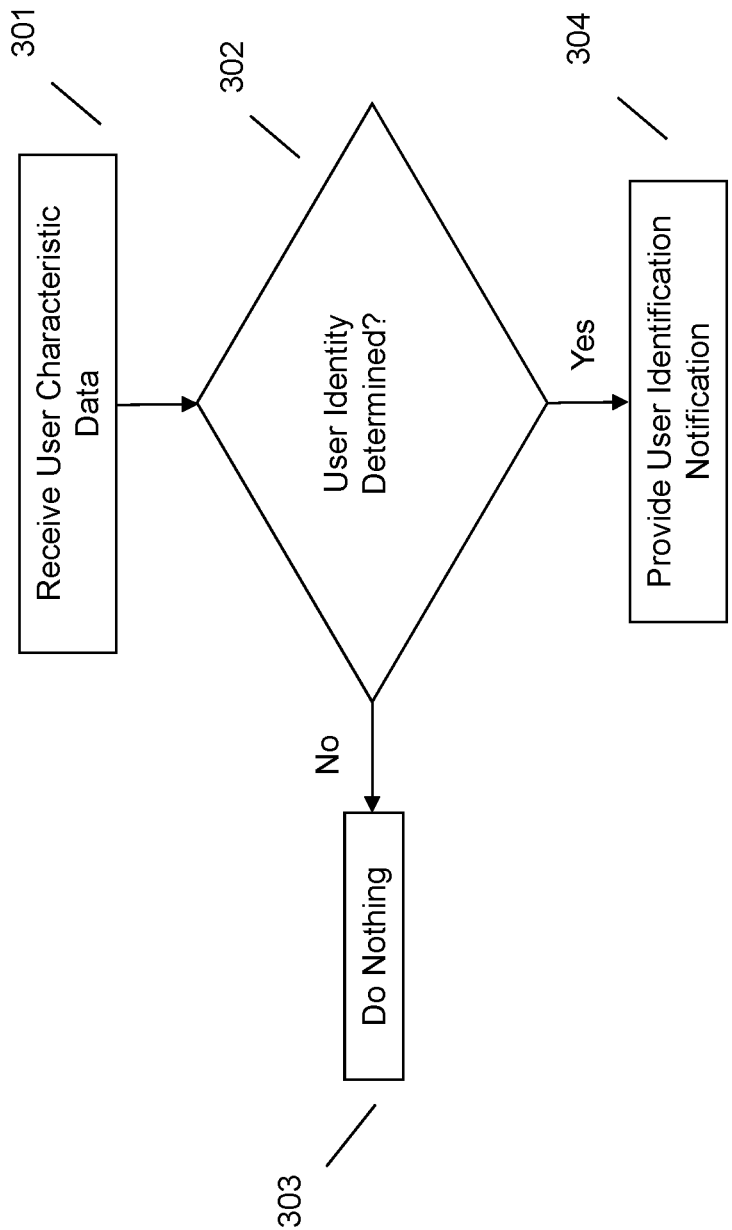
FIG. 3 illustrates an example method of providing a user identification notification to a user interacting with a non-personal device.

Referring now to FIG. 3, an embodiment may determine a user's identity and thereafter provide the user with an indication that the user has been recognized by a non-personal device. At 301, an embodiment may receive user characteristic data associated with a user at a non-personal device. In the context of this application, a non-personal device may be virtually any device that is not owned or frequently operated by a user. For example, a non-personal device may be a digital assistant device located at a friend's house, a terminal device or kiosk located in a public location, another non-personal electronic device located in a shared space, and the like.

In the context of this application, user characteristic data may be virtually any data that is not explicitly provided by a user and that may provide an indication of the user's identity to the device. In an embodiment, the user characteristic data may be obtained by one or more sensors such as cameras, microphones, receivers, other sensors, and the like, operatively coupled to or in communication with (e.g., via wired communication, wireless communication, etc.) the non-personal device. For example, user characteristic data may be associated with a captured image of a user's face, a captured audio sample of a user's voice, etc. In another example, user characteristic data may be a captured signal associated with a device known to be associated with a user such as a user's smart phone, smart watch, tablet, other user-associated device, and the like. Other user characteristic data not explicitly mentioned here may also be detected and received.

At 302, an embodiment may determine the identity of a user by using the received user characteristic data. For example, an embodiment may access an accessible user database (e.g., stored locally on the device, remotely on another device, in cloud storage, etc.) and determine whether the received user characteristic data matches any characteristic data associated with a stored user in the user database. For example, an embodiment may arrive at a positive identification if an embodiment determines that a captured image of a user comprises the same facial features of a stored user (e.g., via image analysis, etc.). In another example, an embodiment may arrive at positive identification if an embodiment determines that a received wireless signal (e.g., from a user's smart phone, etc.) matches a wireless signal associated with a stored user.

In an embodiment, the user database may be associated with a particular location. For example, a user may be able to provide user characteristic data to an airport database prior to arrival at the airport. Once the user arrives at the airport and interacts with a terminal housing a digital assistant, the digital assistant may be able to compare user characteristic data obtained from a current user to stored data that was previously entered. In another embodiment, the user database may be associated with a particular brand. For example, user characteristic data may be obtained from all or a subset of users using Brand A smart phones. Thereafter, a non-personal, Brand A device may be able to detect user characteristic data from a user characteristic data providing Brand A user.

Responsive to not determining, at 302, a user's identity, an embodiment may, at 303, do nothing. Alternatively, an embodiment may provide a notification informing the user that the user's identity could not be determined. Conversely, responsive to determining, at 302, the user's identity, an embodiment may provide, at 304, a user identification notification.

In an embodiment, the user identification notification may take many forms and/or may be specific to the user. In this regard, the user identification notification may be unique to the user and different from user identification notifications for other users. For example, a user may configure the user identification notification to be one or more of an audible, visual, haptic, etc. type of notification. For instance, a user may configure the user identification notification to be an audible notification that greets the user by name (e.g., "Hello User A, how are you doing today", etc.). In another instance, a user may configure the user identification notification to be a predetermined visual notification such as a predetermined color output, blink pattern, screen animation, drawing, and the like. Such embodiments may enable a user to be apprised of whether or not a device has properly identified the user. In an embodiment, the user identification notification may be provided by the non-personal device and/or may be provided by another device (e.g., a user's smart phone, a user's wearable device, etc.).

In an embodiment, the user identification notification may be provided at a time prior to receipt of user activation input. For example, the user identification notification may be automatically provided in certain circumstances such as when a user makes eye contact with a non-personal device, when a user stays within proximity of a non-personal device for a predetermined prior of time, when a user enters a predetermined proximity of a non-personal device, and the like. Additionally, an embodiment may allow a user to enable options to automatically auto-connect, or never auto-connect, to non-personal devices in airports, hotels, restaurants, other shared environments, and the like.

In an embodiment, although a non-personal device may provide a user identification notification responsive to identifying a user, a digital assistant resident on the non-personal device may not accept and/or process user commands until a wake word unique to the identified user is received. For example, a user at an airport may see that a non-personal airport terminal device has notified them that it has recognized the user's identity (e.g., via the presence of a predetermined colored blinking pattern, etc.). A user may thereafter wake a digital assistant resident on the non-personal airport terminal device by providing a preconfigured, customized wake word, e.g., "salamander". Alternatively, in another embodiment, a digital assistant resident on a non-personal device may automatically activate responsive to the non-personal device identifying the user.

Responsive to identifying a user and/or receiving a customized identified user wake word, an embodiment may provide a list of permissions available to an identified user and/or features enabled on the non-personal device for the identified user. Such an embodiment may inform a user if certain user-specific data is accessible by the user on the non-personal device. Additionally or alternatively, such an embodiment may inform a user about what functions may be performed by the non-personal device. An embodiment may communicate these permissions and/or features to the user using one or more output devices (e.g., display screens, microphones, etc.). For example, a non-personal device located in a university setting may display (e.g., on a display screen operatively coupled to the non-personal device, etc.) different permissions for students and professors. Furthermore, certain functions capable of being performed by the device may only be enabled responsive to identifying that a professor is interacting with the device as opposed to a student.

In another embodiment, an embodiment may automatically load one or more user preferences on the non-personal device. For example, an embodiment may automatically adjust a default display layout of the non-personal device to a layout that was previously configured by an identified user. In another example, an embodiment may automatically adjust an accent and/or volume level of audible output to an accent and/or volume level that was previously configured by an identified user.

Responsive to identifying a user, an embodiment may have access to additional contextual information associated with the identified user. For example, an embodiment may have access to a user's emails, documents, preconfigured settings, and the like. In an embodiment, an identified user may provide one or more command inputs to the non-personal device. The one or more command inputs may comprise at least one deictic word or pronoun that obtains its context from the user's identity. Furthermore, the non-personal device may access a user's contextual information in order to properly execute a function associated with the command comprising the at least one deictic word or pronoun. For example, an identified user accessing a non-personal terminal device at an airport may provide the command "load my boarding pass". Based on the user's identity, an embodiment may access a database of an airport to search for a boarding pass that correlates with the user's identity. In another example, an embodiment having access to an identified user's stored documents may receive the command "play my party playlist". An embodiment may disambiguate the pronoun "my" as being associated with the identified user. An embodiment may thereafter access the identified user's files and find the appropriate party playlist file.

The various embodiments described herein thus represent a technical improvement to conventional user identification notification techniques. Using the techniques described herein, an embodiment may receive user characteristic data associated with a particular user at a non-personal device. An embodiment may then identify the user based on this user characteristic data and thereafter provide a user identification notification to the user. Such a notification may apprise a user that a device has recognized a user's identity and is capable of receiving a user-specific wake word and/or is capable of processing user-specific commands.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
dynamically detecting, at a non-personal information handling device, user characteristic data associated with a user;
determining, using a processor and based on the user characteristic data, an identity of the user;
providing, based on the determining, a user identification notification, wherein the user identification notification is particular to the user and is provided to the user as long as a gaze of the user is focused on the non-personal information handling device;
presenting, subsequent to provision of the user identification notification, a list of permissions available to the user on the non-personal information handling device based on the identity;
accessing contextual information associated with the user;

receiving a command input from the user, wherein the command input comprises at least one deictic word that makes the command input ambiguous;

ascribing context to the at least one deictic word from the contextual information;

disambiguating, subsequent to the ascribing, the command input; and performing a function dictated by the command input.

2. The method of claim 1, wherein the user identification notification is provided prior to receipt of user activation input.

3. The method of claim 1, wherein the user identification notification is specific to the identified user.

4. The method of claim 1, wherein the determining comprises accessing a user database associated with the non-personal information handling device and determining if the user characteristic data matches characteristic data of a stored user in the user database.

5. The method of claim 1, wherein the providing comprises providing the user identification notification on another device.

6. The method of claim 1, further comprising providing, responsive to determining the identity of the user, a list of permissions available to the identified user on the non-personal information handling device.

7. The method of claim 1, further comprising loading, responsive to determining the identity of the user, one or more user preferences on the non-personal information handling device.

8. The method of claim 1, wherein the user identification notification is selected from the group consisting of a visual notification, an audible notification, and a haptic notification.

9. An information handling device, comprising:
a processor;
a memory device that stores instructions executable by the processor to:
dynamically detect user characteristic data associated with a user;
determine, based on the user characteristic data, an identity of the user; and
provide, based on the determining, a user identification notification, wherein the user identification notification is particular to the user and is provided to the user as long as a gaze of the user is focused on the non-personal information handling device;
present, subsequent to provision of the user identification notification, a list of permissions available to the user on the non-personal information handling device based on the identity;
access contextual information associated with the user;
receive a command input from the user, wherein the command input comprises at least one deictic word that makes the command input ambiguous;
ascribe context to the at least one deictic word from the contextual information;
disambiguate, subsequent to the ascribing, the command input; and
perform a function dictated by the command input;

wherein the information handling device is a non-personal information handling device.

10. The information handling device of claim 9, wherein the user identification notification is selected from the group consisting of a visual notification, an audible notification, and a haptic notification.

11. The information handling device of claim 9, wherein the instructions executable by the processor to determine comprise instructions executable by the processor to access a user database associated with the information handling device and determine if the user characteristic data matches characteristic data of a stored user in the user database.

12. The information handling device of claim 9, wherein the instructions executable by the processor to provide comprise instructions executable by the processor to provide the user identification notification on another device.

13. The information handling device of claim 9, wherein the instructions are further executable by the processor to provide, responsive to determining the identity of the user, a list of permissions available to the identified user on the information handling device.

14. The information handling device of claim 9, wherein the instructions are further executable by the processor to load, responsive to determining the identity of the user, one or more user preferences on the non-personal information handling device.

15. The information handling device of claim 9, wherein the user identification notification is specific to the identified user.

16. A product, comprising:
a storage device that stores code, the code being executable by a processor and comprising:
code that dynamically detects, at a non-personal device, user characteristic data associated with a user;
code that determines, based on the user characteristic data, an identity of the user; and
code that provides, based on the code that determines, a user identification notification, wherein the user identification notification is particular to the user and is provided to the user as long as a gaze of the user is focused on the non-personal information handling device;
code that presents, subsequent to provision of the user identification notification, a list of permissions available to the user on the non-personal information handling device based on the identity;
code that accesses contextual information associated with the user;
code that receives a command input from the user, wherein the command input comprises at least one deictic word that makes the command input ambiguous;
code that ascribes context to the at least one deictic word from the contextual information;
code that disambiguates, subsequent to the ascribing, the command input; and
code that performs a function dictated by the command input.

* * * * *